Dec. 23, 1969 W. G. PAIGE 3,486,144
PUSHBUTTON SWITCH WITH FEEL PROVIDED BY MAGNETIC ATTRACTION
Filed Aug. 29, 1967
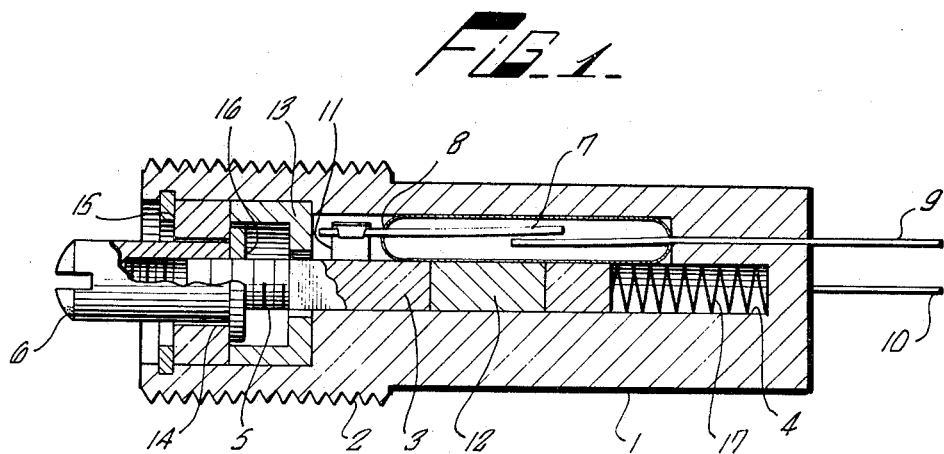
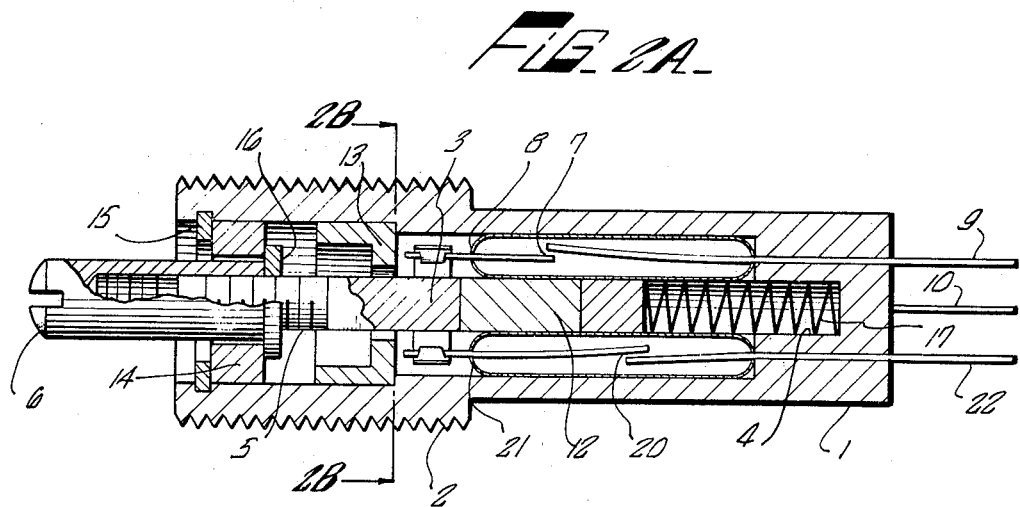
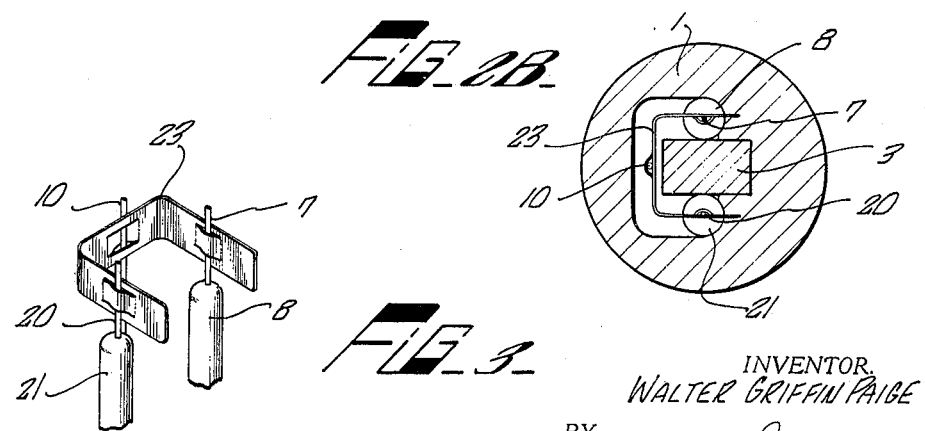
INVENTOR.
WALTER GRIFFIN PAIGE
BY
Christie, Parker & Hale
ATTORNEYS

# United States Patent Office 3,486,144
Patented Dec. 23, 1969

3,486,144
PUSHBUTTON SWITCH WITH FEEL PROVIDED
BY MAGNETIC ATTRACTION
Walter Griffin Paige, Pasadena, Calif., assignor to Burroughs Corporation, Detroit, Mich., a corporation of Michigan
Filed Aug. 29, 1967, Ser. No. 664,022
Int. Cl. H01h 9/00
U.S. Cl. 335—206
9 Claims

ABSTRACT OF THE DISCLOSURE

The state of a switch actuated responsive to a magnetic field is changed by a movable member to which a magnet is attached. In one position of the movable member, the magnet is located so its field does not actuate the switch. In another position of the movable member, the magnet is located so its field actuates the switch. Magnetic attraction exists between a fixed member and the movable member such that the attractive magnetic force decreases as the movable member moves from one position to the other. In an embodiment for a three-position switch, a free member is interposed between the fixed member and the movable member. An attractive magnetic force exists between the fixed member and the free member and a larger attractive magnetic force exists between the free member and the movable member. A stop restrains the free member as the movable member reaches a point intermediate of its extreme positions.

BACKGROUND OF THE INVENTION

This invention relates to manual switches and, more particularly, to a switch actuated responsive to the field of a manually movable magnet.

In most manual switches the operator can feel the transition of the switch from one state to another as he moves the switch actuating member from one position to another. The conventional toggle switch, for example, has a pronounced transition that the operator can feel.

Magnetically actuated switches such as ferrite reed switches are currently being incorporated into manually operated switch assemblies. The reed switch is actuated by the field of a magnet that is connected to the actuating member. Since no direct mechanical connection exists between the contacts of the reed switch and the actuating member, the operator cannot feel the exact point at which the switch undergoes a transistion from one state to another.

SUMMARY OF THE INVENTION

According to the invention an attractive magnetic force is established between a fixed member and an actuating member of a switch that is actuated responsive to a magnetic field. When the operator moves the actuating member, he feels an abrupt reduction in the resistance to movement as the fixed member and the actuating member are separated. This feel signifies a switch transition from one state to another.

A three-position switch is formed by interposing a free member between the fixed member and the actuating member. An attractive magnetic force exists between the fixed member and the free member and a larger attractive magnetic force exists between the free member and the actuating member. A stop prevents the movement of the free member with the actuating member to the extremity of its path of travel. Thus as the actuating member moves through its path of travel, a transition from one switch position to the other is felt by the operator when the free member is first released from the fixed member and another switch transition is felt by the operator when the actuating member is then released from the free member.

In one embodiment, the actuating member is a spring-loaded pushbutton. A ring of magnetic material attached to the switch housing surrounds the pushbutton. A permanent magnet surrounding the pushbutton is disposed between the ring and a flange portion of the pushbutton. A greater attractive magnetic force exists between the flange portion and the magnet than exists between the ring and the magnet. The stop for the magnet is a cylindrical body that surrounds the pushbutton. The stop has a larger inside diameter than the diameter of the flange portion of the pushbutton and a smaller inside diameter than the diameter of the permanent magnet. In a two-position switch, one end of the cylindrical body is mounted in abutment with the magnet so it can not move. Using the terminology of the previous two paragraphs, the fixed member is the magnet. In a three-position switch, the end of the cylindrical body is mounted in normally spaced apart relationship from the permanent magnet. Thus, the ring becomes the fixed member and the magnet becomes the free member.

BRIEF DESCRIPTION OF THE DRAWING

The features of a specific embodiment of the invention are illustrated in the drawing, in which:

FIG. 1 is a side elevation view in section of a single-position switch; incorporating the principles of the invention;

FIGS. 2A and 2B are a side elevation view in section and a cross-sectional view, respectively, of a three-position switch incorporating the principles of the invention; and FIG. 3 is a perspective view of a connector employed in the switch of FIG. 2.

DESCRIPTION OF SPECIFIC EMBODIMENTS

In FIG. 1 a cylindrical switch housing 1 is shown having a threaded portion 2 for mounting the switch on a control panel or the like. An actuating member 3 having a rectangular cross section is adapted to move back and forth within a chamber 4 inside of housing 1. At one end, actuating member 3 has a surface 5 that is cylindrical and threaded. The threads of surface 5 engage the threaded interior surface of a pushbutton 6. A magnetic reed switch 7 enclosed in an envelope 8 is situated in housing 1 adjacent to actuating member 3. A lead 9 is directly connected to one contact of switch 7 through the back of housing 1, while a lead 10 is connected to the other contact of switch 7 by a connector 11, the details of which are discussed further in connection with FIG. 3. A permanent bar magnet 12 is sandwiched between the ends of actuating member 3. As actuating member 3 moves back and forth, it carries magnet 12 with it. The field of magnet 12 serves to actuate switch 7, when actuating member 3 is moved toward the right (as viewed from FIG. 1). A cup 13 having cylindrical side walls and a circular end wall with an opening through which actuating member 3 passes is located within housing 1. Cup 13 retains the position of switch 7. An annual free permanent magnet 14 having north and south poles at opposite ends surrounds pushbutton 6. A snap ring 15 made of magnetic material is mounted in an annular groove in housing 1. A flange portion 16 of pushbutton 6 has a diameter that is smaller than the inside diameter of the cylindrical portion of cup 13 so it may ride through cup 13. A compression spring 17 acting through actuating member 3 urges flange portion 16 against the end surface of annular magnet 14. Magnet 14 is held stationary between snap ring 15 and the end of cup 13. In this position permanent bar magnet 12 is so located that its field does not actuate switch 7. When the operator presses pushbutton 6, the attractive magnetic force between annular magnet 14 and flange portion 16 initially provides a substantial resistance to movement. As the operator overcomes this force, flange portion 16 is released abruptly from magnet 14 and the operator can feel a sudden and pronounced reduction in the resistance to the depression of pushbutton 6. At this point, actuating member 3 has carried permanent magnet 12 to a position in which its magnetic field actuates switch 7. The circular end of cup 13 provides a stop on the movement of flange portion 16. The position of magnet 12 relative to switch 7 is adjusted by turning pushbutton 6. As pushbutton 6 turns, its threaded connection with actuating member 3 causes magnet 12 to move close to flange portion 16.

A three-position switch is shown in FIGS. 2A and 2B. The parts of this switch that are identical to the two-position switch of FIG. 1 bear the same reference numerals. In addition to switch 7, a reed switch 20 is provided. Switch 20, which is enclosed in an envelope 21, is located on the opposite side of actuating member 3 from switch 7, as depicted in FIG. 2B. The contacts of switch 20 are so arranged that as magnet 12 moves from left to right (FIG. 2A), the contacts of switch 7 close before the contacts of switch 20. A lead 22 is directly connected to one contact of switch 20 through the back of housing 1. Lead 10 extends through the back of housing 1 and is coupled to the other contact of switches 7 and 20 by a connector 23, which is illustrated in FIG. 3. Connector 23 is a thin strip of conductor having two 90-degree bends. Two parallel slits are cut in connector 23 for each lead to be attached thereto. A good mechanical and electrical connection is made by threading each lead through the two corresponding slits in connector 23. In the arrangement of FIG. 1 the connector has only one 90-degree bend and two pairs of slits.

The parts of the two-position switch of FIG. 1 that bring about the abrupt release upon the depression of pushbutton 6, namely cup 13, magnet 14, snap ring 15 and flange portion 16, are adapted to a three-position switch by initially spacing magnet 14 from the end of cup 13, as shown in FIG. 2A. A greater attractive magnetic force exists between flange portion 16 and magnet 14 than exists between magnet 14 and snap ring 15. Thus, as pushbutton 6 is initially depressed, magnet 14 first releases abruptly from snap ring 15, moving along with pushbutton 6 due to the magnetic attraction to flange portion 16. When magnet 14 is released from snap ring 15, bar magnet 12 is positioned so as to close switch 7. Upon further depression of pushbutton 6, magnet 14 moves into abutment with the end of cup 13 so the relative positioning between cup 13, magnet 14, and flange portion 16 is the same as in the arrangement of FIG. 1 prior to depression of pushbutton 6. As pushbutton 6 is depressed further, flange portion 16 abruptly releases from magnet 14. As this occurs, bar magnet 12 is positioned so that its field actuates switch 20.

All the parts of the switches in FIGS. 1 and 2 not stated to be made from magnetic material are made from non-magnetic material.

What is claimed is:

1. A manual switch assembly comprising:
   a housing;
   a pushbutton depressible into the housing;
   a spring opposing depression of the pushbutton;
   switch means within the housing actuated into one of two states responsive to a magnetic field;
   a magnet connected to the pushbutton and located within the housing such that the switch is actuated into one state upon partial depression of the pushbutton and into the other state upon complete depression of the pushbutton;
   a first member fixed to the housing;
   a second member fixed to the pushbutton at a point so it moves away from the first member as the pushbutton is depressed;
   a third member free to move with respect to the housing and the pushbutton located between and in abutment with the first and second members while the pushbutton is undepressed, an attractive magnetic force existing between the first and third members and a greater attractive magnetic force existing between the second and third members; and
   a stop for preventing movement of the third member with the second member after the pushbutton is partially depressed into the housing.

2. The switch assembly of claim 1, in which the magnet is connected to the pushbutton by an actuating member having a threaded connection with the pushbutton such that rotation of the pushbutton varies the extent of engagement of the threaded connection.

3. The switch assembly of claim 1, in which the length of the switch is oriented parallel to the direction of movement of the pushbutton, a pair of leads for the switch extend through the housing in a direction parallel to the direction of movement of the pushbutton; one of the leads is attached directly to one contact of the switch; the other lead is laterally displaced from the other contact of the switch; and a connector couples the other lead to the other contact of the switch; the connector comprises a strip of conductive material bent so the other lead and the other contact traverse its surface; and the strip has two pairs of parallel slits in its surface through which the other lead and the other contact are threaded.

4. The switch assembly of claim 1, in which the first member is an annular permanent magnet surrounding the pushbutton and held fixed between a retaining ring and the end of a cylindrical cup, and the second member is a flange on the pushbutton that abuts the ring when the pushbutton is underpressed and moves through the cup as the pushbutton is depressed.

5. A pushbutton switch comprising:
   a housing;
   a depressible member extending into the housing;
   a spring opposing depression of the member;
   a first switch within the housing actuated responsive to a magnetic field;
   a switch actuating magnet within the housing attached to the depressible member such that the magnetic field of the magnet actuates the first switch upon partial depression of the member and actuates the second switch upon further depression of the depressible member;
   a first member attached to the housing;
   a second member attached to the depressible member at a point so it moves away from the first member as the pushbutton is depressed;
   a third member free to move with respect to the housing and the depressible member located between and in abutment with the first and second members while the depressible member is undepressed, an attractive magnetic force existing between the first and third members and a greater attractive magnetic force existing between the second and third members; and
   means for preventing movement of the third member with the second member after the depressible member is partially depressed.

6. The pushbutton switch of claim 5, in which:
   the first, second, and third members are annular and surround the depressible member, the third member having a larger outside diameter than the second member;
   and the means for preventing movement of the third member is a stationary cylinder surrounding the depressible member, the inside diameter of the cylinder being larger than the outside diameter of the second member and smaller than the outside diameter of the third member.

7. A manual switch assembly comprising:
   a housing;
   a switch within the housing actuated responsive to a magnetic field;

a spring-loaded depressible actuating member adapted to move back and forth through the housing;

a magnet carried back and forth within the housing by the actuating member such that the field of the magnet actuates the switch when the actuating member is in one position and fails to actuate the switch when the actuating member is in a second position;

a retaining ring surrounding the actuating member and fixed to the housing;

a flange spaced from the retaining ring such that it moves away from the retaining ring as the actuating member is depressed;

an annular permanent magnet surrounding the actuating member and disposed between the retaining ring and the flange; and a stationary cup surrounding the actuating member such that the flange passes through the interior of the cup as an actuating member is depressed, the inside diameter of the cup being smaller than the outside diameter of the annular magnet.

8. The switch assembly of claim 7, in which the end of the cup abuts one end of the annular magnet so the annular magnet is fixed between the cup and the retaining ring.

9. The switch assembly of claim 7, in which the end of the cup is spaced from one end of the annular magnet so the annular magnet is free to move.

References Cited

UNITED STATES PATENTS

| | | | |
|---|---|---|---|
| 3,222,474 | 12/1965 | Fasola | 335—188 X |
| 3,233,061 | 2/1966 | Jones. | |
| 3,361,999 | 1/1968 | Leinaner et al. | |
| 3,109,908 | 11/1963 | Clason | 335—207 |
| 3,175,060 | 3/1965 | Crissinger et al. | 335—205 |
| 3,223,801 | 12/1965 | Cummins et al. | 335—206 |
| 3,271,708 | 9/1966 | McCormick | 335—205 |
| 3,283,274 | 11/1966 | DeFalco | 335—206 |
| 3,292,123 | 12/1966 | Siklos | 335—205 |

ROBERT K. SCHAEFER, Primary Examiner

R. A. VANDERHYE, Assistant Examiner

U.S. Cl. X.R.

200—67, 159; 335—207